US008979965B2

(12) United States Patent
Minaeeghainipour

(10) Patent No.: US 8,979,965 B2
(45) Date of Patent: Mar. 17, 2015

(54) MAGNETIC ATTACHMENT FOR BOX FAN FILTER

(71) Applicant: Mehran Minaeeghainipour, Ellsworth, MI (US)

(72) Inventor: Mehran Minaeeghainipour, Ellsworth, MI (US)

( * ) Notice: Subject to any disclaimer, the term of this patent is extended or adjusted under 35 U.S.C. 154(b) by 0 days.

(21) Appl. No.: 13/875,975

(22) Filed: May 2, 2013

(65) Prior Publication Data

US 2013/0340400 A1    Dec. 26, 2013

Related U.S. Application Data

(60) Provisional application No. 61/662,455, filed on Jun. 21, 2012.

(51) Int. Cl.
| | | |
|---|---|---|
| *B01D 39/00* | (2006.01) | |
| *B01D 46/00* | (2006.01) | |
| *B01D 46/10* | (2006.01) | |

(52) U.S. Cl.
CPC ............ *B01D 46/0002* (2013.01); *B01D 46/10* (2013.01); *B01D 2265/023* (2013.01)
USPC ................... 55/490; 55/467; 55/488; 55/496; 55/500; 55/502

(58) Field of Classification Search
CPC ..................................................... B01D 46/02
USPC ........ 55/488, 490, 496, 500, 502, 511, 385.1, 55/467; 96/74; 415/148
See application file for complete search history.

(56) References Cited

U.S. PATENT DOCUMENTS

| | | | |
|---|---|---|---|
| 2,575,499 A | 3/1949 | Manow | |
| 3,912,473 A | 10/1975 | Wilkins | |
| 4,781,526 A | 11/1988 | Mead | |
| 6,257,976 B1 | 7/2001 | Richardson, III | |
| 6,527,838 B2 | 3/2003 | Volo et al. | |
| 7,393,272 B2 | 7/2008 | Sundet | |
| 8,137,426 B2 | 3/2012 | Whittemore | |
| 2007/0140924 A1* | 6/2007 | Hill | 422/124 |
| 2007/0245701 A1* | 10/2007 | Su | 55/490 |
| 2008/0115473 A1 | 5/2008 | Miller | |
| 2008/0264019 A1* | 10/2008 | Walker | 55/488 |
| 2009/0199526 A1 | 8/2009 | Wallace | |
| 2010/0313535 A1* | 12/2010 | Crook | 55/502 |
| 2012/0148387 A1* | 6/2012 | Labrecque | 415/148 |
| 2012/0305094 A1 | 12/2012 | Wallace | |
| 2014/0150658 A1* | 6/2014 | Prax | 96/74 |

FOREIGN PATENT DOCUMENTS

JP          408136024 A      5/1996

\* cited by examiner

*Primary Examiner* — Robert Clemente
*Assistant Examiner* — Karla Hawkins
(74) *Attorney, Agent, or Firm* — Traverse Legal, PLC

(57) ABSTRACT

An air filter attachment apparatus for temporarily attaching a furnace-type air filter to a face of a box fan with a ferromagnetic box frame. The attachment apparatus comprises a plurality of magnetic flaps secured to respective top and side edges of the air filter, either directly or via a filter-receiving frame. The filter/frame is sized to approximate the face dimensions of the fan, and the flaps are foldable forwardly toward the fan to lie flat on top and side surface of the fan's metal box frame. Each flap includes magnetic attachment means to secure the flap to the fan.

9 Claims, 5 Drawing Sheets

MAGNETIC ATTACHMENT FOR BOX FAN FILTER

RELATED APPLICATIONS/PRIORITY BENEFIT CLAIM

This application claims the benefit of U.S. Provisional Application No. 61/662,455, filed Jun. 21, 2012 by the same inventor (Minaeeghainipour), the entirety of which provisional application is hereby incorporated by reference.

FIELD

The subject matter of the present application is in the field of replaceable filters for portable box fans.

BACKGROUND

Replaceable filters for portable box fans are known. Examples include: U.S. Pat. No. 4,781,526 to Mead (bracket structure mounted on fan for receiving a filter in sliding fashion); U.S. Pat. No. 7,393,272 to Sundet (adhesive-attached hooks mounted on the sides of the fan, with elastic straps extending through the hooks to hold a filter to the face of the fan); U.S. Pat. No. 6,527,838 to Volo et al. (stick-on right-angled brackets mounted on the fan with adjustable clearance to snugly hold filters against the faces of a fan); U.S. Pat. No. 8,137,426 to Whittemore (filter frame removably mounted against the face of a box fan with straps or cords to receive a filter).

Despite these previous attempts to provide convenient air filtration on portable box fans, I am not aware of any commercially viable products. This indicates to me that these previous attempts have not been found to be sufficiently functional, convenient, aesthetically acceptable, or economical.

Accordingly, I have invented a filter attachment apparatus that solves the apparent problems with the prior art filter attachment kits.

BRIEF SUMMARY

In broad form, my invention is a magnetic attachment structure mounted to, or incorporated into, a replaceable or disposable rectangular (usually square) air filter of the type commonly used in HVAC furnaces. The magnetic attachment structure comprises three magnetic flaps, one magnetic flap extending from each of the top and side edges of the filter. The magnetic flaps are capable of folding forward onto corresponding top and side surfaces of the rectangular steel frame on a metal box fan.

"Box" is used herein to mean any portable fan having a generally rectangular (usually square) metal frame, with four sides (top, bottom, left and right sides), two fan faces (front and back), and a face-to-face depth generally in the range of several inches or more. The fan may be plug-in or battery powered, and is of the portable type, such that the fan may be turned toward or away from a location, room, or person, as desired.

In one form, the magnetic flaps comprise a set of separate flaps attached to the top and sides of the filter with adhesive, for example with peel-and-stick adhesive straps formed on the flaps.

In another form, the magnetic flaps are incorporated in a frame configured to receive a replaceable filter and then mate with the periphery of the box fan.

In another form, the magnetic flaps are integrated with the air filter itself, for example being formed on the sides of the filter when the filter is manufactured.

These and other features and advantages of the invention will become apparent from the detailed description below, in light of the accompanying drawings.

DETAILED DESCRIPTION

Figure 1:
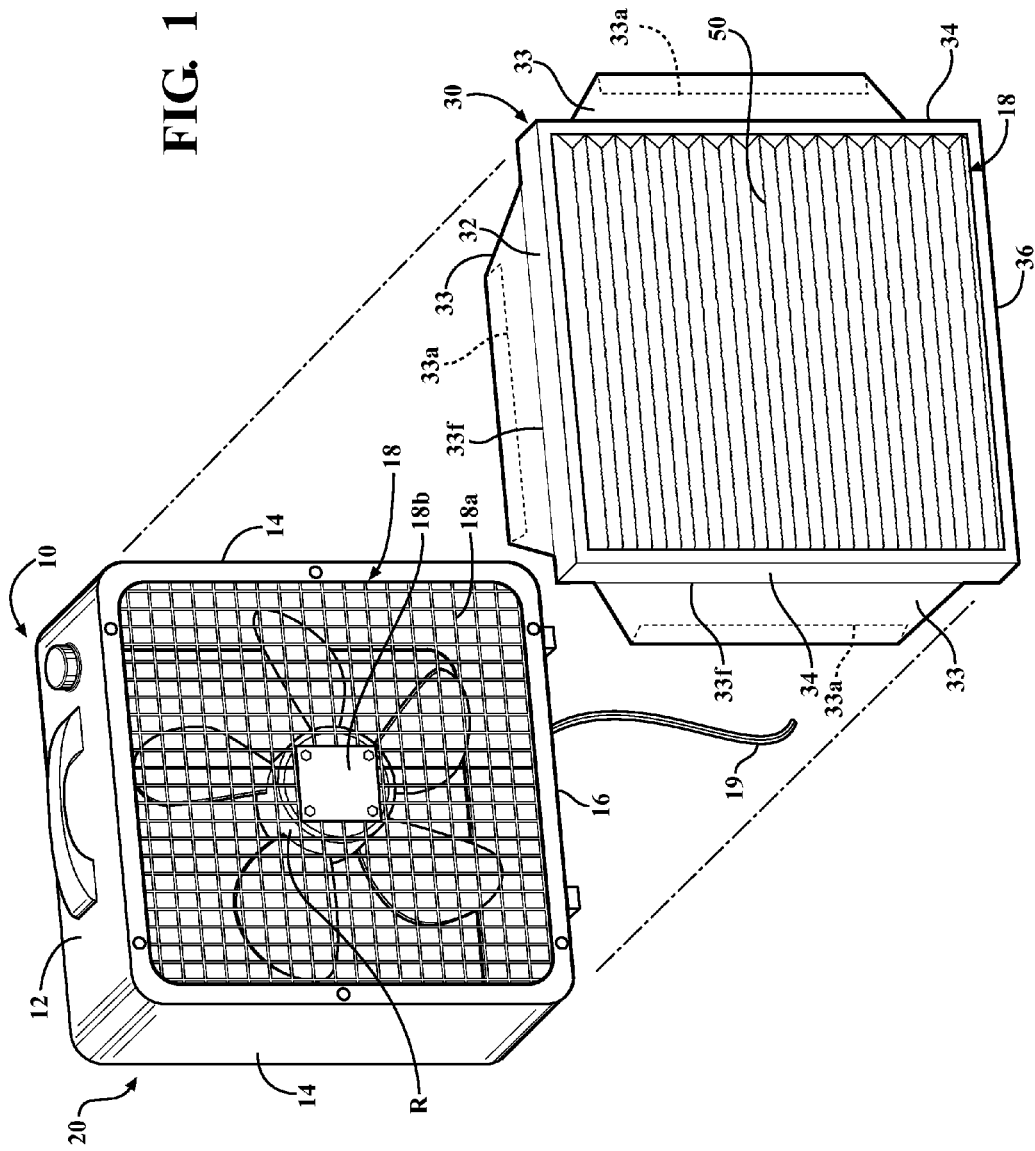
FIG. 1 is an exploded rear perspective view of a box fan and a general representation of an air filter attachment apparatus according to the invention.
Figure 2:
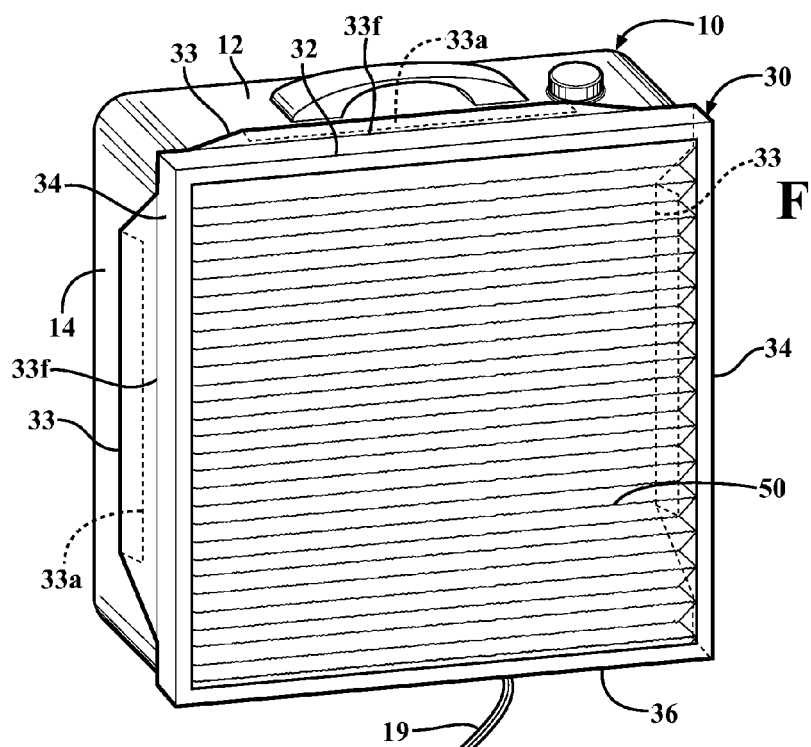
FIG. 2 is a rear perspective view of the fan and filter attachment apparatus of FIG. 1, assembled.
Figure 3:
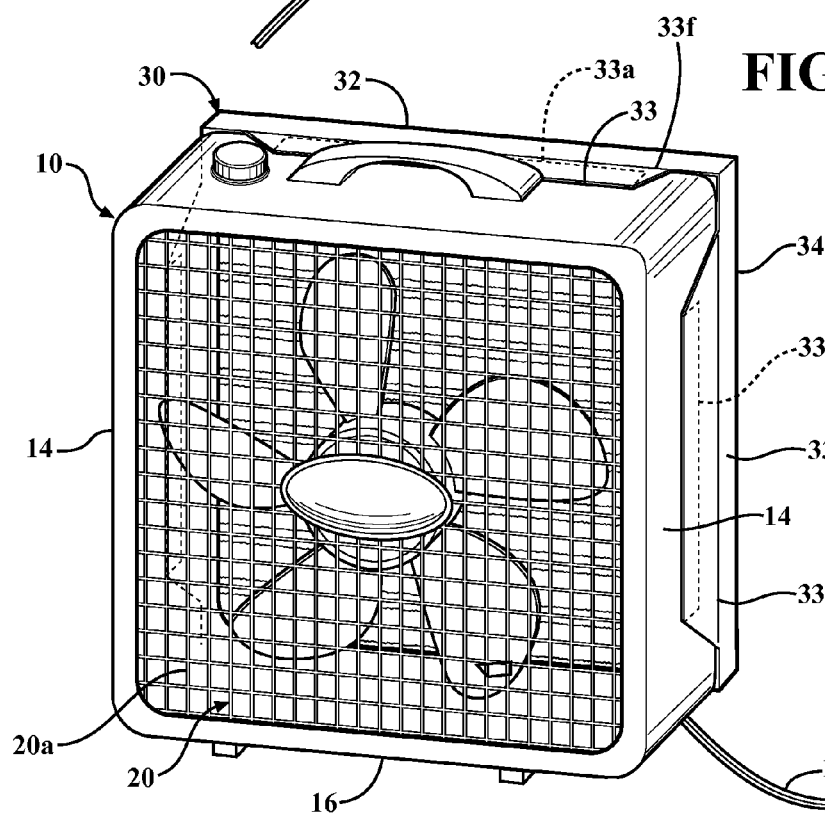
FIG. 3 is similar to FIG. 2, but viewed from a front face of the fan.

Referring first to FIGS. 1 through 3, an air filter attachment apparatus 30 for a box fan 10 is shown in exemplary form in order to teach how to make and use the claimed invention.

In the illustrated example, box fan 10 generically represents rectangular (usually square) framed fans that have a ferromagnetic metal frame with a top 12, sides 14, and a bottom 16; rear and front faces 18 and 20, usually covered by rear and front grilles 18a and 20a; and an electrical power supply 19 (battery or cord-supplied house current) to power the internal motor and fan blade. The corners of the fan 10 may be rounded, as is common, and still be considered rectangular.

Further in the illustrated example, air filter attachment apparatus 30 is either incorporated into, or attached to, or mated with, a rectangular air filter 50 of the type commonly used in household forced-air furnaces. Filter 50 includes a filtration medium or membrane 52 of any known material, often pleated, and structured by a frame comprising a top 32, sides 34, and bottom 36. Frame 32, 34, 36 may be cardboard, plastic, or any other material, including stiffened or reinforced portions of the filtration medium itself, although cardboard is perhaps most common. Filter 50 may be an actual furnace air filter of dimensions similar to those of fan 10, or it may be a filter specially manufactured to custom fit fan 10.

Air filter attachment apparatus 30 comprises three magnetic flaps 33 secured to the filter 50 adjacent the top 32 and sides 34 of the filter frame. The dimensions of the filter frame approximate the dimensions of the face 18 or 20 of fan 10, so that when filter 50 is placed against the rear face 18 or front face 20 the filter medium 52 substantially covers the face, and the edges or frame of the filter 50 are approximately aligned with the edges of the fan. This alignment places flaps 33 in position to be folded or hinged forward to engage and lie essentially flat against the flat top and side surfaces 32, 34 of the fan's metal body when perpendicular to the air filter and the face of the fan, as best shown in FIG. 3. Each flap 33 may be a single continuous flap along its respective top or side edge of the filter, or it could comprise a discontinuous set of spaced flaps along its respective top or side edge of the filter.

Flaps 33 are attached at inner edges 33b to the filter 50 in various ways. In a first example shown in FIG. 4, inner portions or edges 33b of the flaps 33 comprise flat adhesive portions (shown in hidden lines) on their inner faces, by way of preferred (but non-limiting) example strips of peel-and-stick adhesive. Adhesive inner portions 33b are shown attached to the rear faces 32b, 34b of top and sides 32, 34 on a disposable filter 50, preferably by an end user at the time that the filter is being applied to fan 10, although they may also be configured to be secured to the top and sides 32, 34. A fold line 33f near the outer edge of the adhesive 33b allows the outer, free edge 33a of the flap to be folded forward to extend beyond the front face of filter 50 to engage the top or side of the fan's metal box frame. Outer region or edge 33a comprises a flat magnetic means (hidden lines) of any configuration, for example a continuous magnetic strip glued to the inner surface flap, or a magnetized region of the flap, or a plurality of relatively flat magnets, without limitation. The magnetic strip at 33a magnetically locks onto the steel surface of the respective top or side of the fan 10, securely but removably affixing filter 50 to the face of the fan.

Figure 4:
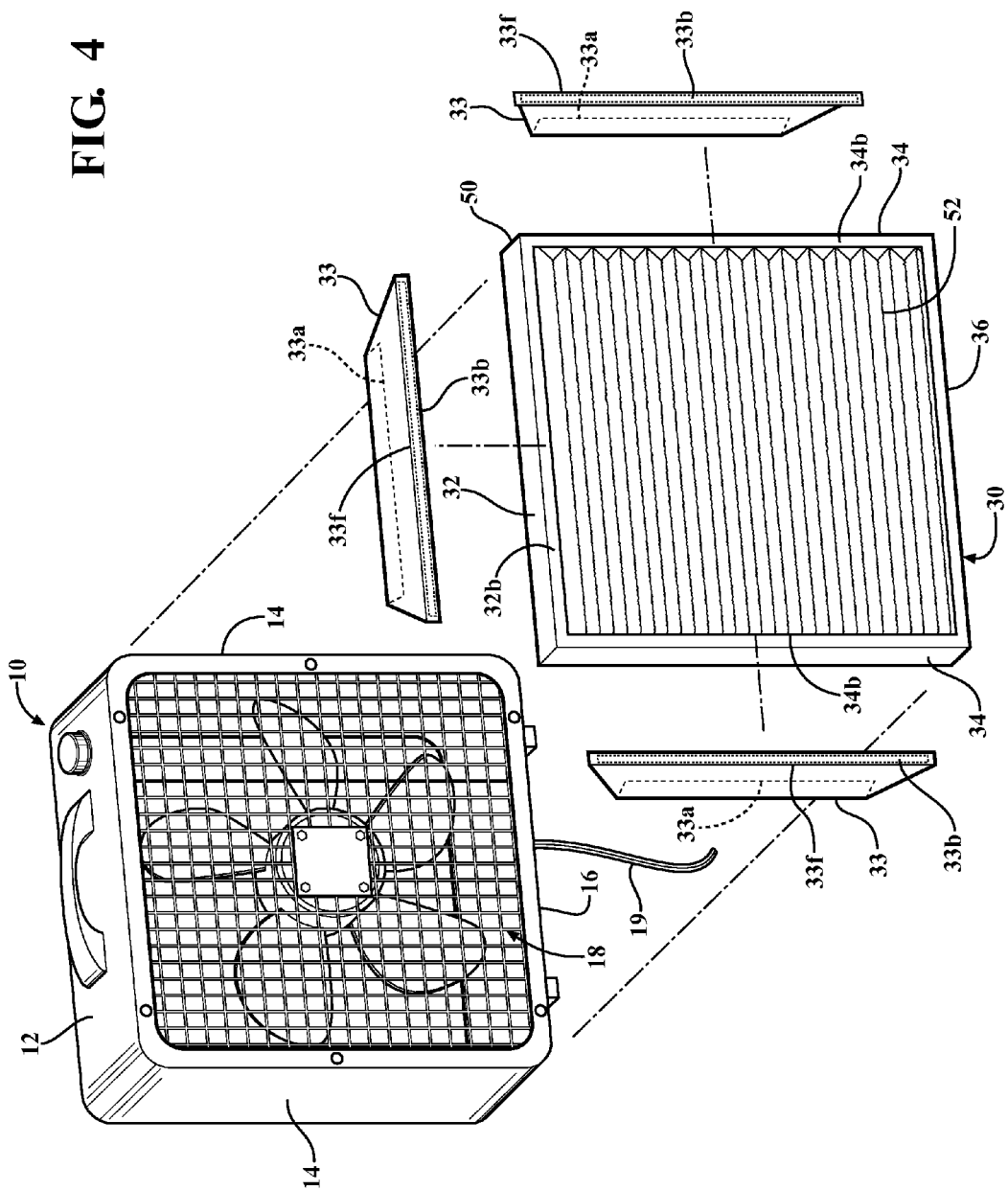
FIG. 4 is similar to FIG. 1, but shows a first embodiment in which the filter attachment apparatus comprises separate magnetic flaps attached adhesively to the air filter.

In the example of FIG. 4, flaps 33 are made from cardboard, with a pre-scored fold line or crease at 33f. Flaps could be made from other materials, including but not limited to plastic, and given the ability to fold against the fan with, for example, flexible material, or living or mechanical hinges.

The shape of the flaps 33 may vary, although the illustrated trapezoidal shape in which the outer free edge portion 33a with the magnetic strip terminates inwardly from the corners of the fan, is preferred.

It will be understood that while the illustrated examples show a filter being secured to the rear (intake) face of the fan using the magnetic flaps of attachment apparatus 30, the filter could equally be affixed to the front (exhaust) face of the fan using the magnetic flaps.

If the dimensions and shape of filter 50 and its frame 32-36 are closely matched to the dimensions and shape of the box frame of the fan, attachment apparatus 30 will not be especially noticeable, leaving the fan's appearance relatively sleek and unchanged. Color can also be matched, if desired.

Figure 5:
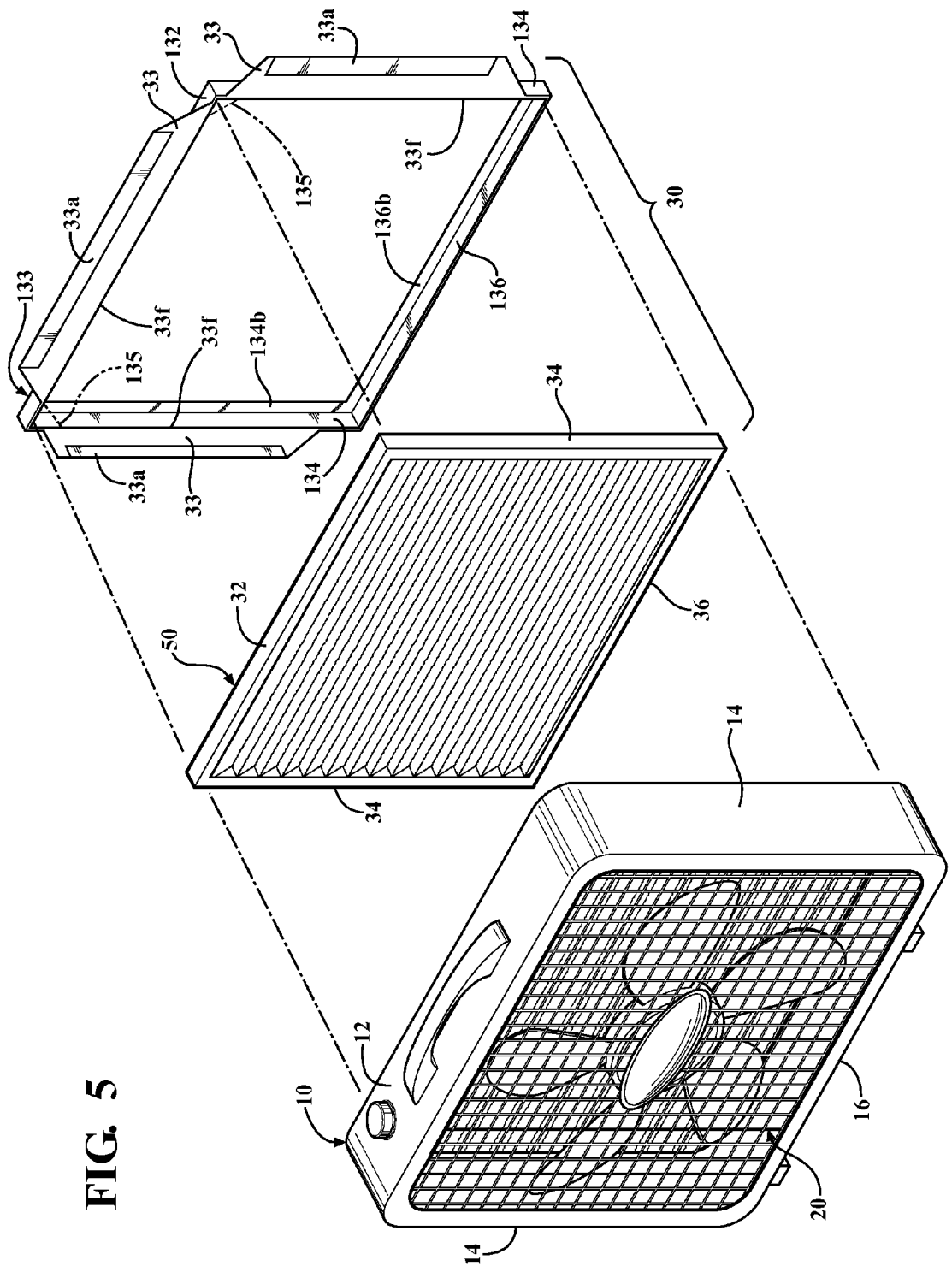
FIG. 5 is an exploded front perspective view of a box fan and a second embodiment of the filter attachment apparatus, in which magnetic flaps are incorporated into a separate frame configured to receive a replaceable air filter and to apply the filter to the fan.

A second example of the filter attachment apparatus 30 is shown in FIG. 5, in which replaceable filter 50 is received in a surrounding reusable frame 133 which incorporates magnetic flaps 33 on its top and side edges. Frame 133 comprises horizontal top edge 132, side edges 134, and a bottom edge 136, backed by vertical rear flanges or stops 132b, 134b, and 136b. The front opening of frame 133 is sized and shaped to receive filter 50 closely therein, with the depth of filter 50 approximately the same as the depth of frame 133. The front opening of frame 133 may also include optional tabs, for example triangular corner tabs 135 illustrated in phantom lines, under which the upper edge or corners of the air filter may be tucked before seating the lower edge of the filter in the frame, to further hold the filter in the frame. Magnetic flaps 33 are similar to flaps 33 in FIG. 4, except that they are permanently incorporated into frame 133, and fold at their inner edge junction 33f with the frame. The materials of the frame may include, without limitation, plastic, cardboard, or metal, but since frame 133 is intended to be reusable as filters 50 are replaced, more durable materials are preferred.

While frame 133 is shown with a preferred four edges 132, 134, and 136, it may be possible to form frame 133 to omit the bottom edge 136, provided the frame remains suitably rigid to receive and nest the air filter 50.

Flaps 33 include magnetic attachment means such as flat magnet strips 33a at their outer free edges. Once filter 50 is placed in frame 133, the filter/frame apparatus can then be applied to a face of fan 10, essentially in the same manner noted above. The combination of the filter/frame apparatus with fan 10 will look essentially the same as that shown in FIG. 3. When filter 50 needs to be cleaned or replaced, flaps 33 are detached from fan 10 by lifting them up to break the magnetic connection, frame 133 is removed from the face of the fan, and filter 50 can be removed from frame 133.

Figure 6:
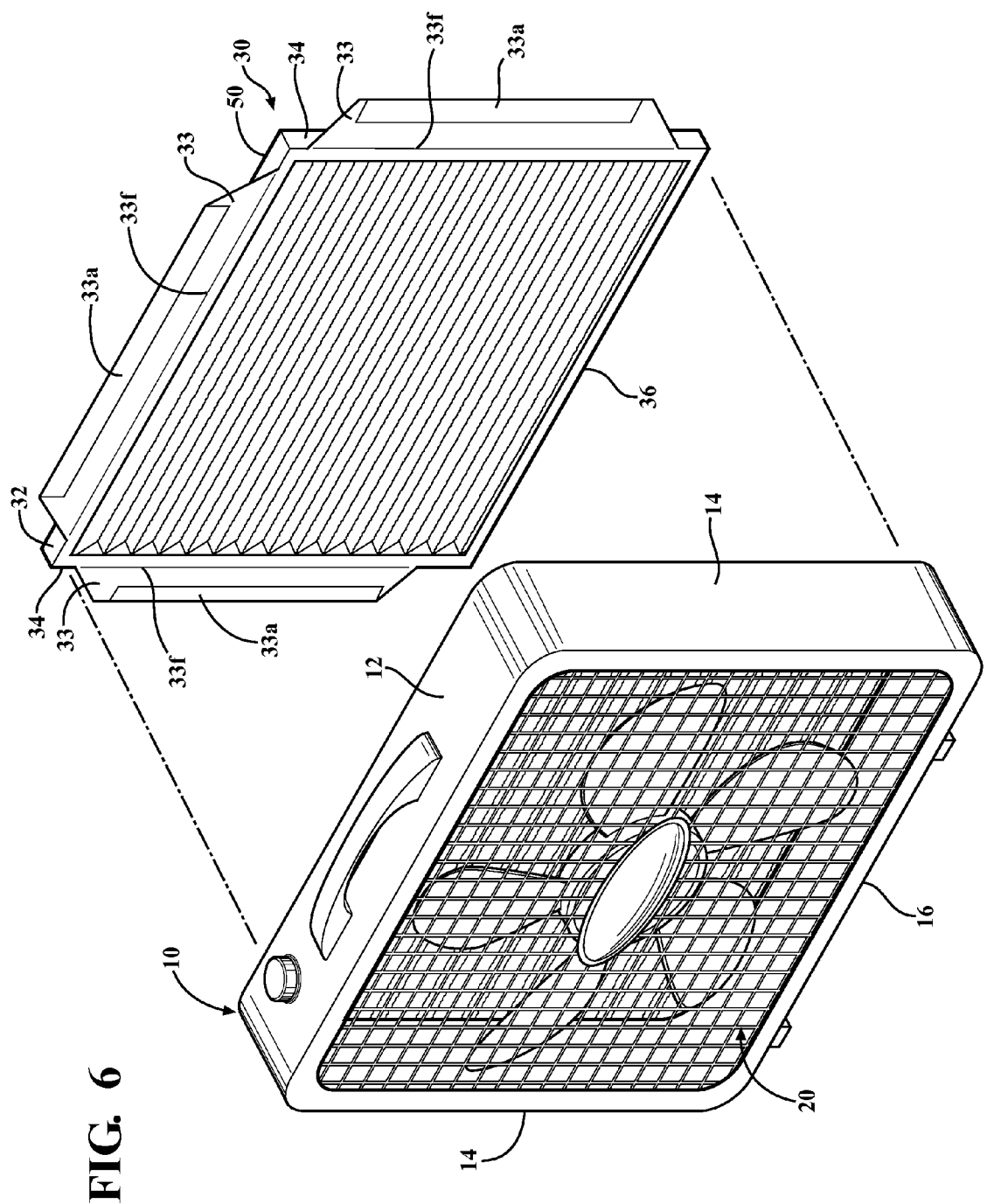
FIG. 6 is an exploded front perspective view of a box fan and a third embodiment of the filter attachment apparatus, in which magnetic flaps are integrated directly with the sides of the air filter itself during manufacture.

FIG. 6 shows a third example of the filter attachment apparatus 30, in which magnetic flaps 33 are incorporated directly and permanently into the (typically) cardboard frame 32, 34, 36 of filter 50, for example during manufacture. Flaps 33 in this example are accordingly disposable with filter 50. The manner of permanent incorporation or integration of flaps 33 with filter 50 may vary. Flaps 33 are engaged with the top and side surfaces of fan 10 in the same manner described above with respect to FIGS. 1-5.

DESCRIPTION OF OPERATION

The inventive air filter attachment apparatus may be sold as an aftermarket conversion kit to be combined with a common furnace filter, or may be sold with the filter or already incorporated into the filter. Because the air filter attachment apparatus is essentially portable apart from the fan, it can be applied to and removed from different fans, even taken traveling, for the purpose of filtering dust and allergens from inside air, for everyday use around the house, and for small home improvement projects. The attachment apparatus results in a trim and compact fit of a filter to a fan, and does not impair or damage the typical cardboard filter in any way when applied. The magnetic attachment does not mar the surface of a fan, and does not require any pre-treatment of the fan surface. The filter attachment apparatus also will not damage the relatively fragile plastic grilles found on many box fans, since it does not rely on or use the front or rear faces of the fan for attachment.

It will be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A filter attachment apparatus for temporarily attaching a rigid, rectangular, replaceable air filter to a face of a rectangular box fan having a metal frame, the apparatus comprising:
   a rigid, rectangular, substantially planar, disposable, forced-air furnace type air filter comprising a planar front face, a top edge, side edges essentially perpendicular to the top edge, and a bottom edge, and a plurality of substantially flat magnetic flaps foldably secured to the air filter in association with the top and side edges of the air filter with at least one of the magnetic flaps associated with each of the top and side edges of the air filter, the magnetic flaps comprising outer free edge portions comprising magnetic attachment means on inner faces thereof, the magnetic flaps having a forward-folded orientation essentially perpendicular to the front face of the air filter with the outer free edge portions extended beyond the front face of the air filter with their inner faces adjacent and perpendicular to the front face of the air filter.

2. The apparatus of claim 1, wherein the magnetic flaps comprise flaps formed separately from the air filter, the flaps comprising adhesive means on inner edge portions thereof, and the adhesive means secured to the air filter on or adjacent the top and side edges of the air filter such that the flaps are disposable with the air filter.

3. The apparatus of claim 1, wherein the magnetic flaps are incorporated into a substantially rigid reusable frame comprising at least top and side edges set rectangularly to one another, the magnetic flaps foldably secured to the reusable frame in association with the top and side edges of the reusable frame with at least one of the magnetic flaps associated with each of the top and side edges of the reusable frame, the reusable frame comprising a rectangular open front face configured to removably receive the air filter and rear top and side stops spaced rearwardly from the open front face a depth substantially equal to a depth of the air filter and extending inwardly from the top and side edges of the reusable frame to receive the rear face of the air filter when the air filter is removably received in the reusable frame.

4. The apparatus of claim 3, wherein the magnetic flaps fold forwardly of the open front face of the reusable frame to a position substantially perpendicular to the front face of the air filter when the air filter is removably received in the frame.

5. The apparatus of claim 1, wherein the magnetic flaps are formed integrally with the air filter and are permanently incorporated adjacent or into the top and side edges of the air filter.

6. In combination with a rectangular box fan with a ferromagnetic metal frame, a filter attachment apparatus for temporarily attaching a rigid, rectangular, substantially planar, disposable, forced-air furnace type air filter to a face of the fan, the apparatus comprising:

a plurality of substantially flat magnetic flaps foldably secured to the air filter in association with the top and side edge portions of the air filter with at least one of the magnetic flaps associated with each of the top and side edges of the air filter, the magnetic flaps comprising outer free edge portions including magnetic attachment means on inner faces thereof, the magnetic flaps having a forward-folded orientation essentially perpendicular to the front face of the air filter and to the face of the fan with the outer free edge portions extended beyond the front face of the air filter with their inner faces adjacent and perpendicular to the front face of the air filter to lay flat against and magnetically attach to metal top and side surfaces of the fan.

7. The combination of claim 6, wherein the dimensions of the filter attachment apparatus when the flaps are folded against the top and side surfaces of the fan approximate the dimensions of the face of the fan between the metal top and side surfaces.

8. The combination of claim 6, wherein the magnetic flaps are secured directly on or adjacent top and side edges of the air filter.

9. The combination of claim 6, wherein the magnetic flaps are secured on or adjacent top and side edges of the air filter through a substantially rigid reusable frame comprising at least top and side edges set rectangularly to one another and configured to receive the air filter, the magnetic flaps extending from the top and side edges of the reusable frame and the air filter being removably mounted in the frame, the magnetic flaps foldably secured to the reusable frame with at least one of the magnetic flaps associated with each of the top and side edges of the reusable frame, the reusable frame comprising a rectangular open front face configured to removably receive the air filter and rear top and side stops spaced rearwardly from the open front face a depth substantially equal to a depth of the air filter and extending inwardly from the top and side edges of the reusable frame to receive the rear face of the air filter when the air filter is removably received in the reusable frame.

* * * * *